United States Patent
Zhang et al.

(10) Patent No.: US 10,764,926 B2
(45) Date of Patent: Sep. 1, 2020

(54) DATA TRANSMISSION METHOD, USER EQUIPMENT, AND BASE STATION

(71) Applicant: HUAWEI TECHNOLOGIES CO., LTD., Shenzhen, Guangdong (CN)

(72) Inventors: Tao Zhang, Beijing (CN); Wurong Zhang, Beijing (CN); Guangwei Yu, Beijing (CN); Feng Yu, Beijing (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 100 days.

(21) Appl. No.: 16/052,174

(22) Filed: Aug. 1, 2018

(65) Prior Publication Data

US 2018/0343678 A1 Nov. 29, 2018

Related U.S. Application Data

(63) Continuation of application No. PCT/CN2016/073176, filed on Feb. 2, 2016.

(51) Int. Cl.
*H04L 12/413* (2006.01)
*H04W 74/08* (2009.01)
(Continued)

(52) U.S. Cl.
CPC ....... *H04W 74/0816* (2013.01); *H04L 5/0048* (2013.01); *H04W 16/14* (2013.01);
(Continued)

(58) Field of Classification Search
CPC ......... H04W 74/0808; H04W 74/0816; H04W 16/14; H04W 74/006; H04W 76/38;
(Continued)

(56) References Cited

U.S. PATENT DOCUMENTS

2008/0013519 A1 1/2008 Kwon et al.
2013/0163575 A1 6/2013 Pak et al.
(Continued)

FOREIGN PATENT DOCUMENTS

CN 101455004 A 6/2009
CN 104486013 A 4/2015
(Continued)

OTHER PUBLICATIONS

R1-152222 LG Electronics et al.,"WF on Start and end position of DL transmission in LAA",3GPP TSG RAN WG1 #80bis,Belgrade, Serbia, Belgrade, Serbia,total 4 pages.

*Primary Examiner* — Abdelillah Elmejjarmi
(74) *Attorney, Agent, or Firm* — Womble Bond Dickinson (US) LLP

(57) ABSTRACT

Embodiments of the present application provide a data transmission method, and the method is used for communication between UE and a base station on an unlicensed spectrum. The method includes: sending, by the UE, a data packet to the base station and starting a timer during a current COD of the base station; determining a first end moment of the current COD; pausing the timer at the first end moment; determining a second end moment of an LP in a next COD of the base station; resuming the timer at the second end moment; and receiving, before the resumed timer expires, a response message from the base station. In the embodiments of the present application, the UE suspends the timer at the end moment of the previous COD and resumes the timer at the end moment of the LP of the next COD.

8 Claims, 6 Drawing Sheets

(51) Int. Cl.
*H04W 76/38* (2018.01)
*H04L 5/00* (2006.01)
*H04W 16/14* (2009.01)
*H04W 74/00* (2009.01)

(52) U.S. Cl.
CPC ..... *H04W 74/006* (2013.01); *H04W 74/0808* (2013.01); *H04W 76/38* (2018.02); *H04W 74/002* (2013.01)

(58) Field of Classification Search
CPC ...... H04B 7/0408; H04B 7/06; H04B 7/0617; H04L 5/0048
See application file for complete search history.

(56) References Cited

U.S. PATENT DOCUMENTS

2015/0049712 A1* 2/2015 Chen ................. H04W 72/1215
370/329
2017/0302496 A1 10/2017 Xu et al.
2018/0091242 A1 3/2018 Li et al.

FOREIGN PATENT DOCUMENTS

| CN | 104812032 A | 7/2015 |
| CN | 105101446 A | 11/2015 |
| WO | 2015131686 A1 | 9/2015 |

* cited by examiner

DATA TRANSMISSION METHOD, USER EQUIPMENT, AND BASE STATION

CROSS-REFERENCE TO RELATED APPLICATIONS

This application is a continuation of International Application No. PCT/CN2016/073176, filed on Feb. 2, 2016, the disclosure of which is hereby incorporated by reference in its entirety.

TECHNICAL FIELD

Embodiments of the present application relate to the communications field, and more specifically, to a data transmission method, user equipment, and a base station.

BACKGROUND

Communications devices need to use a specific spectrum to perform radio communication with each other. If a sending device sends a radio signal on a spectrum, a receiving device receives the radio signal on a corresponding spectrum. Spectrums are roughly classified into two categories: One category is licensed spectrums and the other category is unlicensed spectrums.

A communications device using a licensed spectrum can always occupy the spectrum provided that there is a communication requirement. However, a communications device using an unlicensed spectrum needs to listen whether the unlicensed spectrum is idle, that is, whether the unlicensed spectrum is occupied by another communications device, before starting communication; and the communications device can use the unlicensed spectrum to start communication only when determining that the unlicensed spectrum is idle. The process herein of listening whether the unlicensed spectrum is idle is generally referred to as a listen before talk (LBT) process. In addition, a communications device cannot always occupy an unlicensed spectrum. After using the unlicensed spectrum for a specific time, the communications device needs to stop occupying the spectrum, so that another communications device can obtain an opportunity of using the spectrum. However, a time required in each LBT is random. When there is a small quantity of surrounding devices using the spectrum, a time required in LBT is short. When there is a large quantity of surrounding devices using the spectrum, a specific communications device probably needs to wait for a long time before using the spectrum again; in other words, the communications device spends a relatively long time in LBT.

In a Long Term Evolution (LTE) system, a timer is used in many processes to control a behavior of user equipment (UE). However, in the prior art, it is assumed that each base station can continuously occupy a spectrum. If a base station actually uses an unlicensed spectrum, a probability that UE does not receive a response before a timer expires increases, resulting in a waste of system resources.

SUMMARY

Embodiments of the present application provide a data transmission method, so as to increase a success rate of a UE access process, and improve system resource utilization.

According to a first aspect, a data transmission method is provided, and the method includes:

sending a data packet to a base station and starting a timer during a current COD of the base station;

determining a first end moment of the current COD;

pausing the timer at the first end moment;

determining a second end moment of a long pilot (LP) region in a next COD of the base station;

resuming the timer at the second end moment; and receiving, before the resumed timer expires, a response message sent by the base station.

A COD includes an LP region (also simply referred to as an LP) and a data region (also simply referred to as DATA). The DATA includes n frames, each frame of the n frames includes p subframes and a first set of p short pilots (SPs) that are in a one-to-one correspondence to the p subframes, the LP includes a second set of m SPs, and m, n, and p are positive integers greater than or equal to 1.

In one embodiment, the sending a data packet to a base station during the current COD of the base station includes: sending the data packet to the base station in a data region of the current COD of the base station.

In one embodiment, the determining a first end moment of the current COD includes: receiving a first short pilot signal sent by the base station on a first SP, where the first short pilot signal includes a sequence number of a frame in which the first SP is located and a sequence number of a subframe corresponding to the first SP; and determining the first end moment based on the first short pilot signal.

In one embodiment, the determining a second end moment of an LP in a next COD of the base station includes: receiving a second short pilot signal sent by the base station on a second SP, where the second short pilot signal includes a sequence number of the second SP; and determining the second end moment based on the second short pilot signal.

According to a second aspect, a data transmission method is provided, and the method includes:

receiving, by a base station in a data region of current COD, a data packet sent by UE;

performing, by the base station, an LBT process after the current COD; and sending, by the base station, a response message to the UE in a data region of the next COD after the LBT process.

A COD includes an LP and DATA, the DATA includes n frames, each frame of the n frames includes p subframes and first SPs that are in a one-to-one correspondence to the p subframes, the LP includes m second SPs, and m, n, and p are positive integers greater than or equal to 1.

In one embodiment, the method further includes: sending, by the base station, a first short pilot signal to the UE on a first SP, where the first short pilot signal includes a sequence number of a frame in which the first SP is located and a sequence number of a subframe corresponding to the first SP.

In one embodiment, the method further includes: sending, by the base station, a second short pilot signal to the UE on a second SP in the next COD, where the second short pilot signal includes a sequence number of the second SP.

According to a third aspect, user equipment is provided, including:

a sending module, configured to send a data packet to a base station during current COD of the base station;

a timer module, configured to start a timer;

a determining module, configured to determine a first end moment of the current COD; where the timer module is further configured to pause the timer at the first end moment determined by the determining module;

the determining module is further configured to determine a second end moment of an LP in next COD of the base station; and the timer module is further configured to resume the timer at the second end moment determined by the determining module; and a receiving module, configured to receive, before the resumed timer resumed by the timer module expires, a response message sent by the base station. The user equipment may be configured to perform the processes performed by the user equipment in the method according to the first aspect and the implementations of the first aspect.

According to a fourth aspect, user equipment is provided, including a transmitter, a receiver, a processor, and a memory. The transmitter is configured to send a data packet to a base station during a current COD of the base station. The processor is configured to: start a timer; determine a first end moment of the current COD; pause the timer at the first end moment; determine a second end moment of an LP in a next COD of the base station; and resume the timer at the second end moment. The receiver is configured to receive, before the resumed timer expires, a response message sent by the base station. The memory is configured to store time counted by the timer and store code executed by the processor. The user equipment may be configured to perform the processes performed by the user equipment in the method according to the first aspect and the implementations of the first aspect.

According to a fifth aspect, a computer-readable storage medium is provided. The computer readable storage medium stores a program, and the program enables user equipment to perform the data transmission method according to any one of the first aspect and the implementations of the first aspect.

According to a sixth aspect, a base station is provided, and the base station includes:

a receiving module, configured to receive, in a data region of a current COD, a data packet sent by UE;

a processing module, configured to perform an LBT process after the current COD; and a sending module, configured to send a response message to the UE in a data region of a next COD after the LBT process performed by the processing module. The base station may be configured to perform the processes performed by the base station in the method according to the second aspect and the implementations of the second aspect.

According to a seventh aspect, a base station is provided, including a transmitter, a receiver, a processor, and a memory. The receiver is configured to receive, in a data region of current COD, a data packet sent by UE. The processor is configured to perform an LBT process after the current COD. The transmitter is configured to send a response message to the UE in a data region of next COD after the LBT process. The base station may be configured to perform the processes performed by the base station in the method according to the second aspect and the implementations of the second aspect.

According to an eighth aspect, a computer-readable storage medium is provided. The computer readable storage medium stores a program, and the program enables a base station to perform the data transmission method according to any one of the second aspect and the implementations of the second aspect.

The foregoing timer is a T300 or a T400.

It should be understood that a response message is a response to a data packet. For example, the data packet includes an access request message, and the response message includes an access response message. For another example, the data packet includes uplink data, and the response message includes an ACK message.

It can be learned that, in the embodiments of the present application, the UE suspends the timer at the end moment of the previous COD and resumes the timer at the end moment of the LP of the next COD. In other words, the timer stops time counting during LBT of the base station. This can increase a success rate of a UE access process and reduce a data packet retransmission probability, thereby improving system resource utilization.

DESCRIPTION OF EMBODIMENTS

In the embodiments of the present application, communications devices may include UE and a base station. For example, if a sending device is a base station, a corresponding receiving device may be UE.

The base station in the embodiments of the present application may be a base transceiver station (BTS) in a Global System for Mobile Communications (GSM) or a code division multiple access (CDMA) system, may be a NodeB (NodeB) in a wideband code division multiple access (WCDMA) system, or may be an evolved NodeB (Evolved NodeB, eNB or eNodeB) in an LTE system, a base station device or a micro base station device in a future 5G network, an access point (AP) in WiFi, or the like. The present application sets no limitation thereto.

The UE in the embodiments of the present application may communicate with one or more core networks by using a radio access network (RAN). The UE may be referred to as an access terminal, a terminal device, a subscriber unit, a subscriber station, a mobile station, a mobile console, a remote station, a remote terminal, a mobile device, a user terminal, a terminal, a wireless communications device, a user agent, or a user apparatus. The UE may be a cellular phone, a cordless phone, a Session Initiation Protocol (SIP) phone, a wireless local loop (WLL) station, a personal digital assistant (PDA), a handheld device having a wireless communication function, a computing device, another processing device connected to a wireless modem, an in-vehicle device, a wearable device, a terminal device in a future 5G network, or the like.

Figure 1:
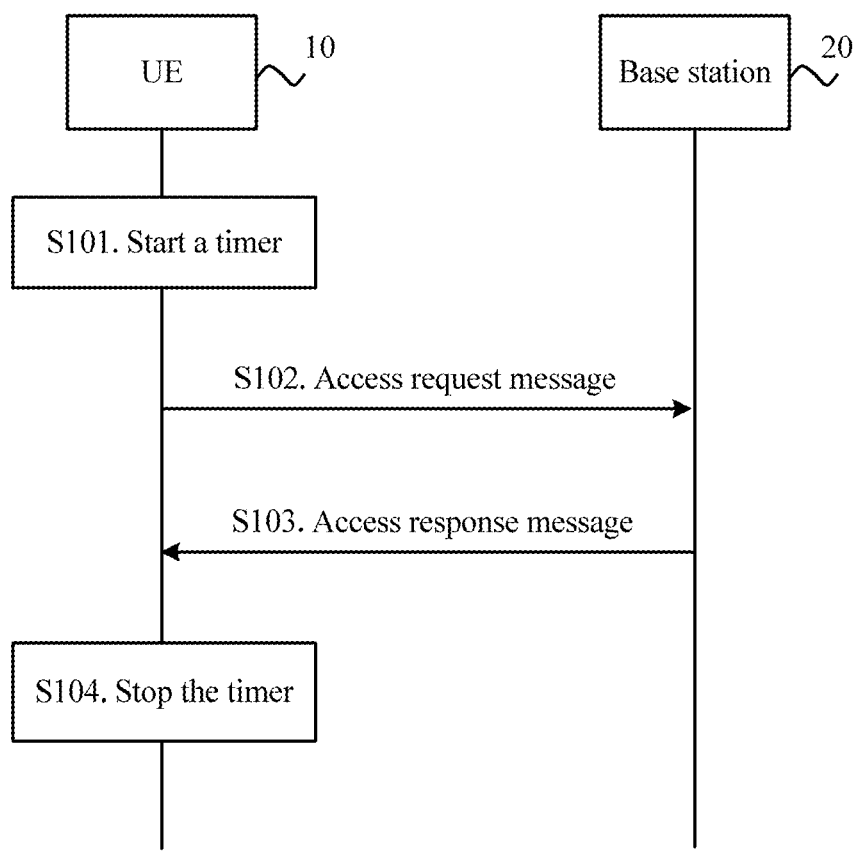
FIG. 1 is a schematic flowchart of UE using a timer in the prior art.

FIG. 1 is a schematic flowchart of UE using a timer in the prior art. FIG. 1 shows UE 10 and a base station 20.

After starting a timer in S101, the UE 10 sends an access request message to the base station 20 in S102. Correspondingly, after receiving the access request message, the base station 20 may send an access response message to the UE 10 in S103. It should be understood that the UE 10 receives, before the timer expires and after S103, the access response message sent by the base station 20; and may stop the timer subsequently in S104.

However, if the UE 10 does not receive the access response message after S102 and before the timer expires, when the timer expires, the UE 10 determines that the access process fails.

In an access process in an LTE system, it is assumed that a base station can continuously occupy a spectrum. However, in a system that uses an unlicensed spectrum, the base station 20 cannot always occupy the spectrum and needs to perform LBT after using the spectrum for a period of time. The base station 20 can use the spectrum again only after determining, through LBT, that the spectrum is idle. During LBT, another device may occupy the spectrum.

Figure 2:
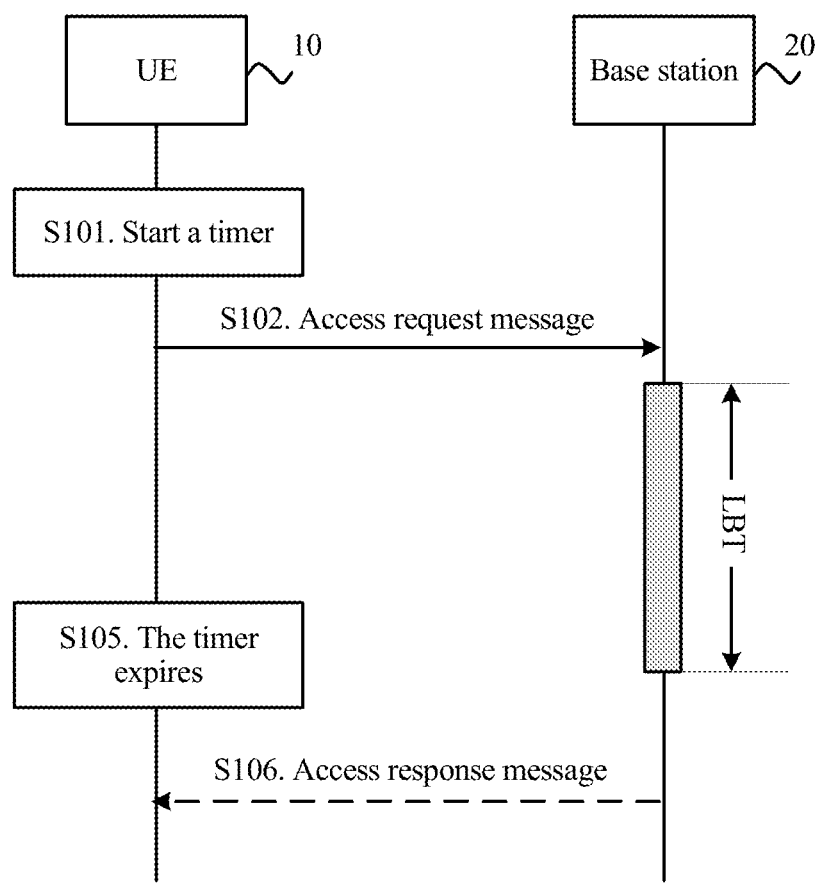
FIG. 2 is a possible schematic flowchart of applying a prior-art timer use scenario to an unlicensed spectrum system.

In this way, as shown in FIG. 2, when an access process in LTE is applied to an unlicensed spectrum system, after receiving, in S102, the access request message sent by the UE 10, the base station 20 may postpone sending of the access response message because the base station cannot continue occupying a spectrum. As a result, a probability that the UE cannot receive the access response before the timer expires in S105 increases. In other words, because the base station 20 performs LBT, the base station 20 sends the access response message in S106 after the timer expires in S105, and therefore the access process fails.

Figure 3:
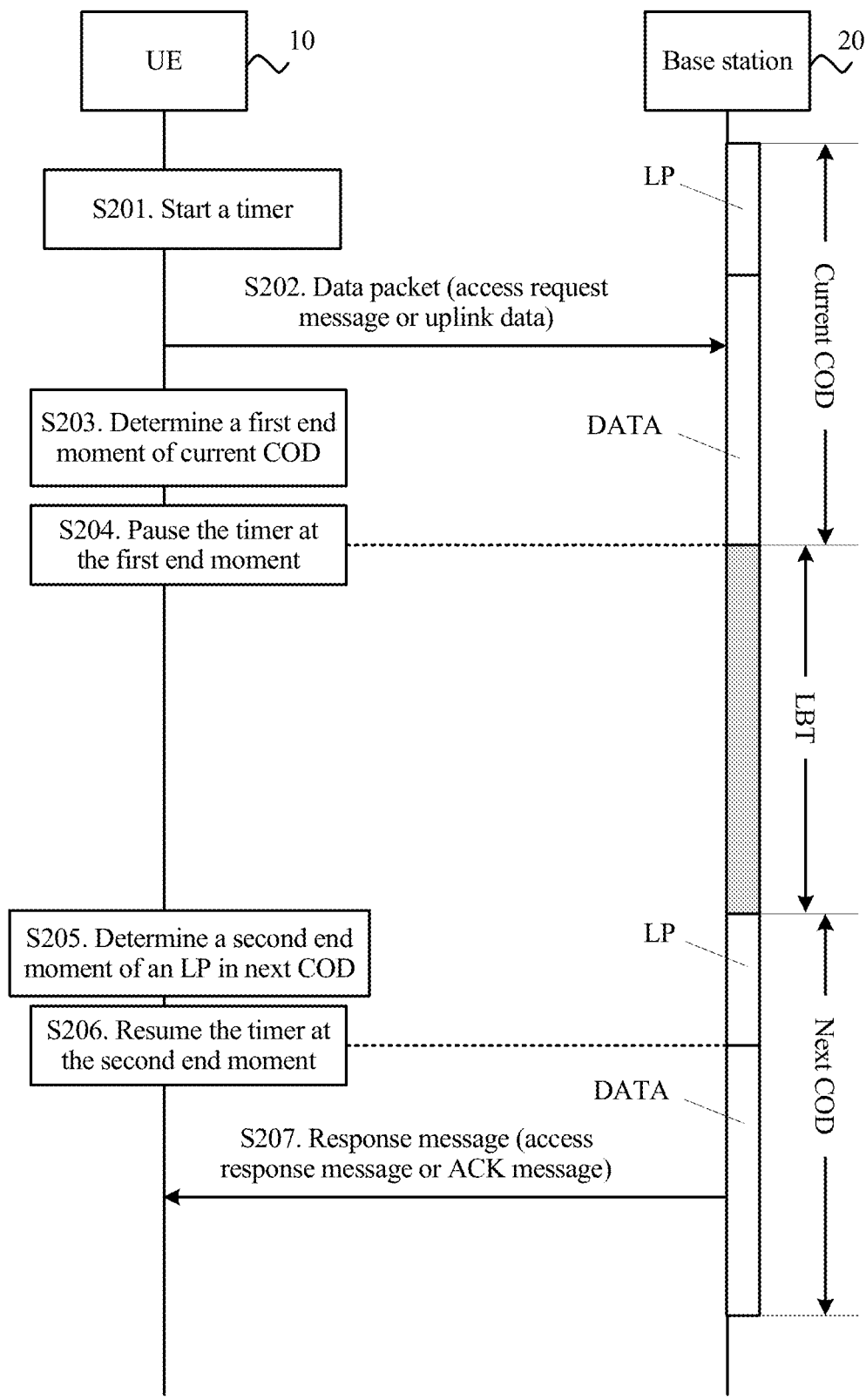
FIG. 3 is a schematic flowchart of using a timer according to an embodiment of the present application.

FIG. 3 is a schematic flowchart of using a timer according to an embodiment of the present application. FIG. 3 shows UE 10 and a base station 20. The UE 10 and the base station 20 communicate with each other on an unlicensed spectrum.

On the unlicensed spectrum, a time segment in which a base station continuously occupies a spectrum each time is referred to as a piece of channel occupation duration (COD), and the base station needs to perform LBT between two adjacent pieces of COD.

Figure 4:
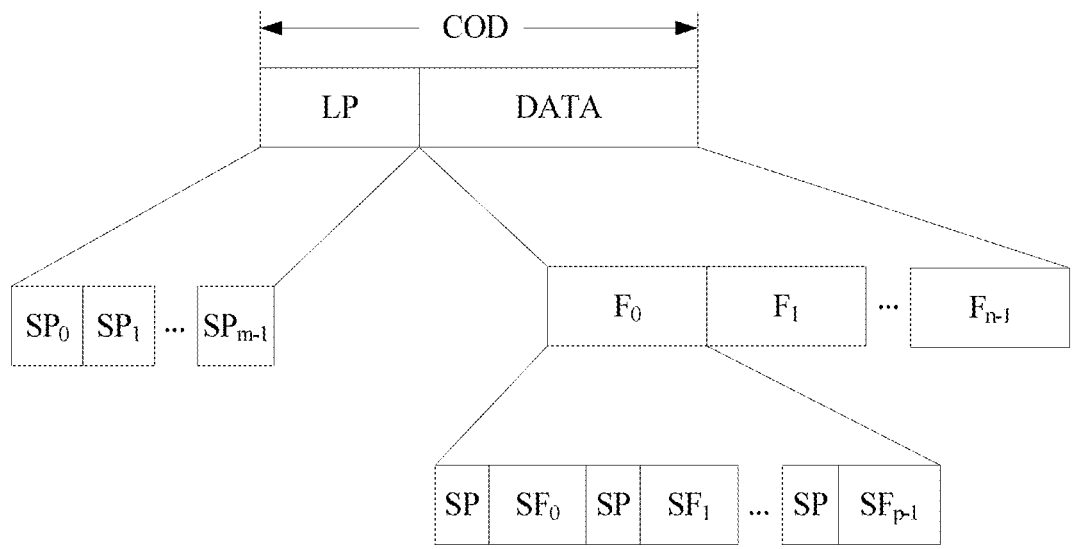
FIG. 4 is a schematic diagram of COD according to an embodiment of the present application.

Each piece of COD includes a long pilot (LP) and data (DATA). In other words, the COD includes two parts: the LP and the DATA, as shown in FIG. 4. The base station may send a pilot to UE in the LP. The base station may exchange data with the UE in the DATA, that is, the base station may send data to the UE or the base station may receive data from the UE.

The LP and the DATA in each piece of COD may each have a further refined structure in terms of time. The LP may include m second short pilots (SPs), for example, $SP_0, SP_1, \ldots,$ and $SP_{m-1}$ in FIG. 4. The DATA may include n frames, for example, $F_0, F_1, \ldots,$ and $F_{n-1}$ in FIG. 4. Each frame in the DATA may include p subframes (for example, $SF_0, SF_1, \ldots,$ and $SF_{p-1}$ in FIG. 4) and first SPs (for example, SPs in FIG. 4) that are in a one-to-one correspondence to the p subframes. A first SP corresponding to a subframe is located before the subframe. Herein, m, n, and p are all positive integers.

A time length for which each frame lasts may be fixed, and a time length for which each subframe lasts may also be fixed. A time length for which each first SP lasts may be fixed, a time length for which each second SP lasts may also be fixed, and a time length for which a first SP lasts and a time length for which a second SP lasts may be equal or unequal.

The base station 20 may send a first short pilot signal to the UE 10 on each first SP, and the first short pilot signal sent on each first SP carries a sequence number of a subframe corresponding to the first SP and a sequence number of a frame in which the subframe is located. For example, a frame number carried in a first short pilot signal sent by the base station 20 to the UE 10 on an SP corresponding to the subframe $SF_1$ in the frame $F_0$ is 0, and a subframe number carried therein is 1.

The base station 20 may send a second short pilot signal to the UE 10 on each second SP, and the second short pilot signal sent on each second SP carries a sequence number of the second SP. For example, a sequence number carried in a second short pilot signal sent by the base station 20 to the UE 10 on the SP1 is 1.

Figure 5:
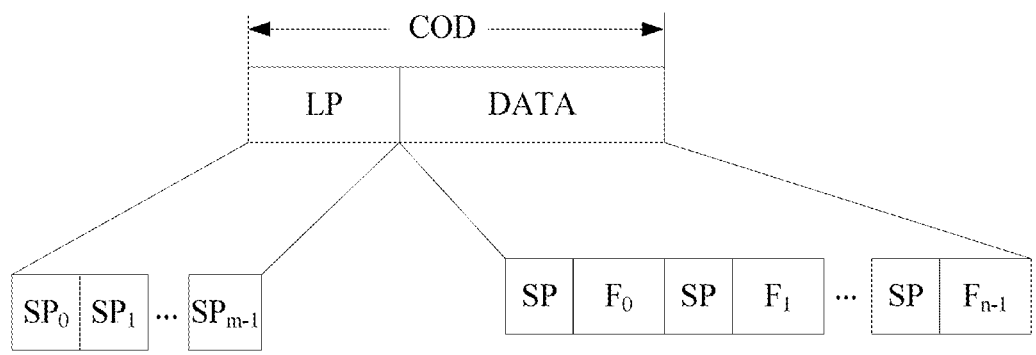
FIG. 5 is another schematic diagram of COD according to an embodiment of the present application.

Optionally, in an embodiment, p=1. In other words, each frame includes one subframe. In this case, it may be understood that DATA includes n frames and n first SPs that are in a one-to-one correspondence to the frames, as shown in FIG. 5. In addition, the base station 20 may send a first short pilot signal to the UE 10 on each first SP, and the first short pilot signal sent on each first SP carries a sequence number of a frame corresponding to the first SP. For example, a frame number carried in a first short pilot signal sent by the base station 20 to the UE 10 on an SP corresponding to a frame $F_0$ is 0.

The method shown in FIG. 3 includes the following operations.

Operation S201. The UE 10 starts a timer.

Operation S202. The UE 10 sends a data packet to the base station 20.

Optionally, the timer may be a T300 or a T400.

Specifically, the UE 10 sends the data packet to the base station 20 and starts the timer in a data region of current COD of the base station 20. In other words, the base station 20 receives, in the data region of the current COD, the data packet sent by the UE 10.

In an embodiment, the data packet may be an access request message.

In another embodiment, the data packet may be uplink data (Uplink Data).

It should be noted that an execution sequence of S201 and S202 is not limited in this embodiment of the present application. For example, S201 and S202 may be performed at the same time, or S201 may be performed after S202.

For example, it is assumed that duration of the timer is set to 5 s in this embodiment of the present application. After S201, the timer may count up, that is, start counting from 0 until 5 s. Alternatively, the timer may count down, that is, start counting from 5 s until 0.

Operation S203. The UE 10 determines a first end moment of current COD.

Herein, the first end moment of the current COD is a first end moment of the data region of the current COD.

Specifically, the UE 10 may receive a first pilot signal sent by the base station 20 on a first SP of DATA, and further determine the first end moment based on the first pilot signal.

For example, in the scenario shown in FIG. 4, the UE 10 may read the first pilot signal to obtain a sequence number of a subframe and a sequence number of a frame that are carried in the first pilot signal, thereby learning of quantities of remaining frames and subframes in the current COD. Therefore, the UE 10 can calculate a remaining time of the current COD, to learn the first end moment of the current COD.

For example, in the scenario shown in FIG. 5, the UE 10 may read the first pilot signal to obtain a sequence number of a frame that is carried in the first pilot signal, thereby learning of a quantity of remaining frames in the current COD. Therefore, the UE 10 can calculate a remaining time of the current COD, to learn the first end moment of the current COD.

Operation S204. The UE 10 pauses the timer at the first end moment.

In other words, the UE 10 suspends the timer at the end moment of the current COD.

For example, if 3 s has elapsed from S201 to S204, time counted by the timer is 3 s (in count-up) or 2 s (in countdown) at this moment. In this case, pausing the timer in S204 means that the time counted by the timer stays at 3 s (in count-up) or 2 s (in countdown).

The base station 20 performs LBT after the current COD expires. Therefore, the UE 10 pauses the timer at the first end moment. In other words, the base station 20 performs an LBT process after the current COD; and in the LBT process performed by the base station 20, the timer of the UE 10 is in a suspended state.

Operation S205. The UE 10 determines a second end moment of an LP in next COD of the base station 20.

The base station 20 occupies a spectrum resource in the next COD after the LBT time.

In one embodiment, the UE 10 detects, after the first end moment, whether the base station 20 starts sending a second pilot signal, in other words, whether the LP of the next COD has started. If the UE 10 detects a second pilot signal sent by the base station 20 on a second SP in the LP of the next COD, the UE 10 may determine a sequence number of the second SP by using the second pilot signal. In this way, the UE 10 may determine a quantity of remaining second SPs in the LP, in other words, determine a moment when the LP expires.

Operation S206. The UE 10 resumes the timer at the second end moment.

In other words, the UE 10 resumes the timer at an end moment of the LP of the next COD.

It should be understood that resuming the timer means starting the suspended timer so that the timer continues to perform time counting.

For example, in S206, the timer continues to perform time counting from a moment: 3 s (in count-up) or 2 s (in countdown), at which the timer is paused in S204. In other words, after S206, the timer automatically stops after continuing to count for 2 s.

Operation S207. Before the timer expires, the UE 10 receives a response message sent by the base station 20.

In one embodiment, the base station 20 may send the response message to the UE 10 in a data region of the next COD after the LBT process. In other words, before the resumed timer expires, the UE 10 may receive, in the data region of the next COD, the response message sent by the base station 20.

In an embodiment, if the data packet in S202 is an access request message, the response message in S207 may be an access response message.

In another embodiment, if the data packet in S202 is uplink data, the response message in S207 may be an acknowledgement (ACK) message or a negative acknowledgement (NACK) message.

Therefore, after S207, the UE 10 may stop the timer.

Alternatively, if the UE 10 does not receive a response message sent by the base station 20 after S206 and before the resumed timer expires, the UE 10 needs to retransmit the data packet after the timer expires.

It can be learned that, in this embodiment of the present application, the UE suspends the timer at the end moment of the previous COD and resumes the timer at the end moment of the LP of the next COD. In other words, the timer stops time counting during LBT of the base station. This can increase a success rate of a UE access process and reduce a data packet retransmission probability, thereby improving system resource utilization.

Figure 6:
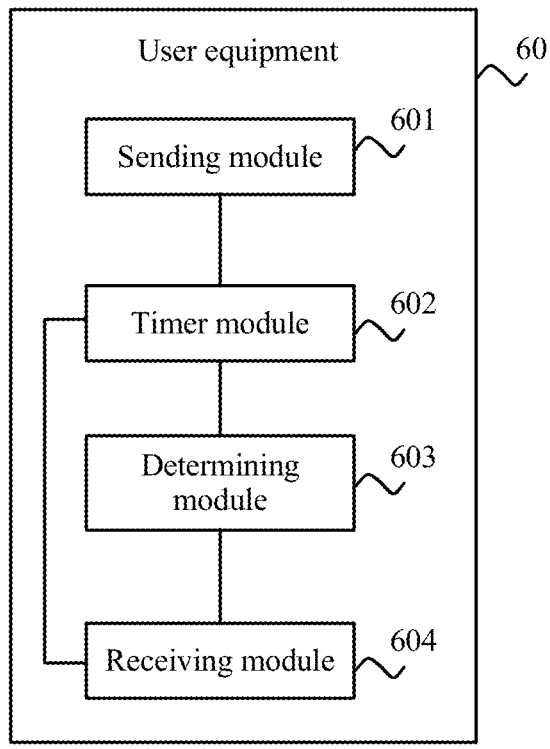
FIG. 6 is a structural block diagram of user equipment according to an embodiment of the present application.

FIG. 6 is a structural block diagram of user equipment according to an embodiment of the present application. The user equipment 60 shown in FIG. 6 and a base station communicate with each other on an unlicensed spectrum. The user equipment 60 includes a sending module 601, a timer module 602, a determining module 603, and a receiving module 604.

The sending module 601 is configured to send a data packet to the base station during current channel occupation duration COD of the base station.

The timer module 602 is configured to start a timer.

The determining module 603 is configured to determine a first end moment of the current COD.

The timer module 602 is further configured to pause the timer at the first end moment determined by the determining module 603.

The determining module 603 is further configured to determine a second end moment of a long pilot LP in next COD of the base station.

The timer module 602 is further configured to resume the timer at the second end moment determined by the determining module 603.

The receiving module 604 is configured to receive, before the resumed timer resumed by the timer module expires, a response message sent by the base station.

A COD includes an LP and DATA. The DATA includes n frames, and each frame of the n frames includes p subframes and first SPs (e.g., a first set of SPs) that are in a one-to-one correspondence to the p subframes. The LP includes m second SPs (e.g., a second set of SPs), and m, n, and p are positive integers greater than or equal to 1.

In one embodiment, the sending module 601 is configured to send the data packet to the base station in a data region of the current COD of the base station.

Optionally, the receiving module 604 is further configured to receive a first short pilot signal sent by the base station on a first SP, where the first short pilot signal includes a sequence number of a frame in which the first SP is located. Further, the determining module 603 is specifically configured to determine the first end moment based on the first short pilot signal.

When p is a positive integer greater than 1, the first short pilot signal may further include a sequence number of a subframe corresponding to the first SP.

Optionally, the receiving module 604 is further configured to receive a second short pilot signal sent by the base station on a second SP, where the second short pilot signal includes a sequence number of the second SP. Further, the determining module 603 is specifically configured to determine the second end moment based on the second short pilot signal.

It can be learned that, in this embodiment of the present application, the UE suspends the timer at the end moment of the previous COD and resumes the timer at the end moment of the LP of the next COD. In other words, the timer stops time counting during LBT of the base station. This can increase a success rate of a UE access process and reduce a data packet retransmission probability, thereby improving system resource utilization.

Figure 7:
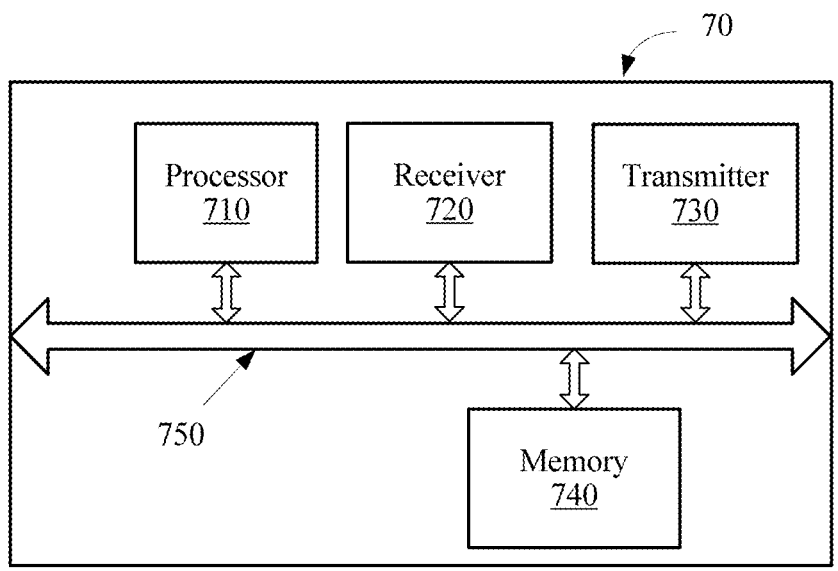
FIG. 7 is another structural block diagram of user equipment according to an embodiment of the present application.

It should be noted that, in this embodiment of the present application, the sending module 601 may be implemented by using a transmitter, the timer module 602 and the determining module 603 may be implemented by using a processor, and the receiving module 604 may be implemented by using a receiver. As shown in FIG. 7, user equipment 70 may include a processor 710, a receiver 720, a transmitter 730, and a memory 740. The memory 740 may be configured to store timing, a first end moment, a second end moment, or the like; and may be further configured to store code or the like executed by the processor 710.

The components in the user equipment 70 are coupled together by using a bus system 750. In addition to a data bus, the bus system 750 further includes a power bus, a control bus, and a status signal bus.

The user equipment 60 shown in FIG. 6 or the user equipment 70 shown in FIG. 7 can implement the processes implemented by the UE in the foregoing method embodiment in FIG. 3. To avoid repetition, details are not described herein.

Figure 8:
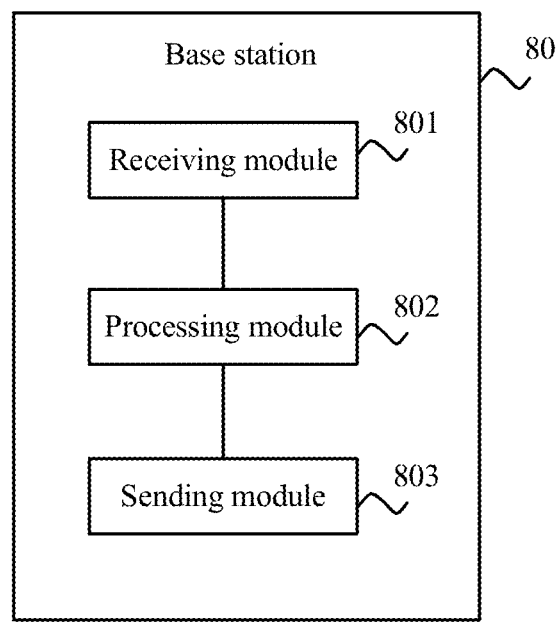
FIG. 8 is a structural block diagram of a base station according to an embodiment of the present application.

FIG. 8 is a structural block diagram of a base station according to an embodiment of the present application. The base station 80 shown in FIG. 8 includes a receiving module 801, a processing module 802, and a sending module 803.

The receiving module 801 is configured to receive, in a data region of current COD, a data packet sent by UE.

The processing module 802 is configured to perform an LBT process after the current COD.

The sending module 803 is configured to send a response message to the UE in a data region of next COD after the LBT process.

For a structure of COD, refer to related descriptions in the sections of FIG. 4 and FIG. 5 in the above. To avoid repetition, details are not described herein again.

Optionally, the sending module 803 may be further configured to send a first short pilot signal to the UE on a first SP. The sending module 803 may be further configured to send a second short pilot signal to the UE on a second SP of the next COD.

The first short pilot signal may include a sequence number of a frame in which the first SP is located and a sequence number of a subframe corresponding to the first SP. If p=1, the first short pilot signal includes the sequence number of the frame in which the first SP is located.

The second short pilot signal includes a sequence number of the second SP.

Figure 9:
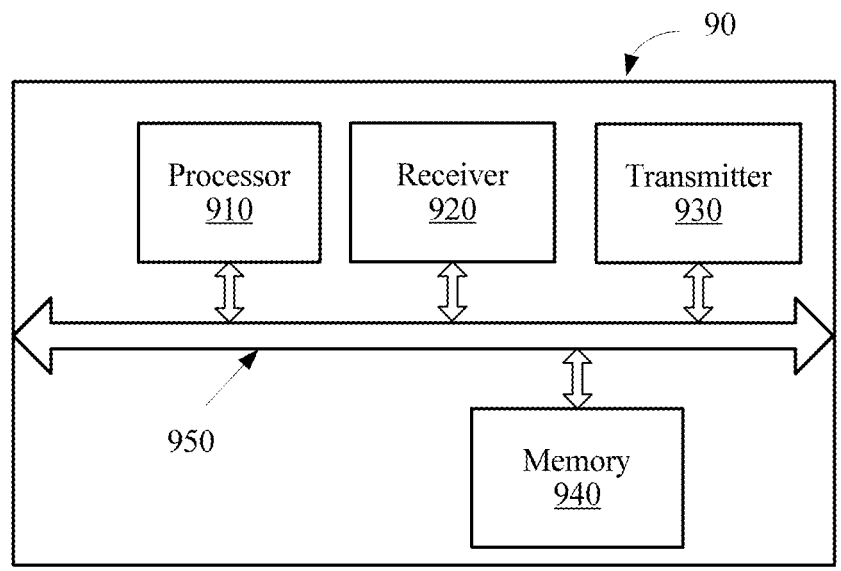
FIG. 9 is another structural block diagram of a base station according to an embodiment of the present application.

It should be noted that, in this embodiment of the present application, the sending module 803 may be implemented by using a transmitter, the processing module 802 may be implemented by using a processor, and the receiving module 801 may be implemented by using a receiver. As shown in FIG. 9, a base station 90 may include a processor 910, a receiver 920, a transmitter 930, and a memory 940. The memory 940 may be configured to store a first pilot signal, a second pilot signal, or the like; and may be further configured to store code or the like executed by the processor 910.

The components in the base station 90 are coupled together by using a bus system 950. In addition to a data bus, the bus system 950 further includes a power bus, a control bus, and a status signal bus.

The base station 80 shown in FIG. 8 or the base station 90 shown in FIG. 9 can implement the processes implemented by the base station in the foregoing method embodiment shown in FIG. 3. To avoid repetition, details are not described herein again.

It should be noted that the foregoing method embodiments of the present application may be applied to a processor, or may be implemented by a processor. The processor may be an integrated circuit chip and has a signal processing capability. In an implementation process, steps in the foregoing method embodiments can be implemented by using a hardware integrated logical circuit in the processor, or by using instructions in a form of software. The processor may further be a general-purpose processor, a digital signal processor (DSP), an application-specific integrated circuit (ASIC), a field programmable gate array (FPGA) or another programmable logic device, a discrete gate or a transistor logic device, or a discrete hardware component. All methods, steps, and logical block diagrams disclosed in the embodiments of the present application may be implemented or performed. The general-purpose processor may be a microprocessor or the processor may be any regular processor or the like. Steps of the methods disclosed in the embodiments of the present application may be directly performed and completed by a hardware decoding processor, or may be performed and completed by using a combination of hardware and software modules in the decoding processor. The software module may be located in a mature storage medium in the field, such as a random access memory, a flash memory, a read-only memory, a programmable read-only memory, an electrically-erasable programmable memory, or a register. The storage medium is located in the memory, and the processor reads information in the memory and completes the steps in the foregoing methods in combination with hardware of the processor.

It may be understood that, the memory in the embodiments of the present application may be a volatile memory or a nonvolatile memory, or may include a volatile memory and a nonvolatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. For example but not for limitation, many forms of RAMs are available, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that the memory in the system and method described in this specification aims to include but is not limited to these memories and any memory of another proper type.

Persons of ordinary skill in the art may be aware that, the units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. Persons skilled in the art may use different methods to implement the described functions for each particular application, but it should not be considered that the implementation goes beyond the scope of the present application.

It may be clearly understood by persons skilled in the art that, for the purpose of convenient and brief description, for a detailed working process of the system, apparatus, and unit, refer to a corresponding process in the method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual needs to achieve the objectives of the solutions of the embodiments.

In addition, functional units in the embodiments of the present application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of the present application essentially, or the part contributing to the prior art, or some of the technical solutions may be implemented in a form of a software product. The software product is stored in a storage medium, and includes several instructions for instructing a computer device (which may be a personal computer, a server, a network device, or the like) to perform all or some of the steps of the methods described in the embodiments of the present application. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The descriptions are only specific implementations of the present application, but are not intended to limit the protection scope of the present application. Any variation or replacement readily figured out by persons skilled in the art within the technical scope disclosed in the present application shall fall within the protection scope of the present application. Therefore, the protection scope of the present application shall be subject to the protection scope of the claims.

What is claimed is:

1. A data transmission method, comprising:
receiving, by a base station in a data region of a current channel occupation duration (COD), a data packet from user equipment (UE); performing, by the base station, a listen before talk (LBT) process after the current COD; and sending, by the base station, a response message to the UE in a data region of a next COD after the LBT process,
wherein each COD comprises DATA, the DATA comprises n frames, and each frame of the n frames comprises p subframes and a first set of p short pilots (SPs) that are in a one-to-one correspondence to the p subframes; and
sending, by the base station, a first short pilot signal to the UE on a first SP of the first set of p SPs, wherein the first short pilot signal comprises a sequence number of a frame in which the first SP is located, wherein n and p are positive integers greater than or equal to 1.

2. The method according to claim 1, wherein p is a positive integer greater than 1, and the first short pilot signal further comprises a sequence number of a subframe corresponding to the first SP.

3. The method according to claim 1, wherein the COD further comprises an LP, and the LP comprises a second set of m short pilots (SPs); and the method further comprises: sending, by the base station, a second short pilot signal to the UE on a second SP of the second set of SPs in the next COD, wherein the second short pilot signal comprises a sequence number of the second SP; wherein m is a positive integer greater than or equal to 1.

4. The method according to claim 1, wherein the data packet comprises an access request message, and the response message comprises an access response message.

5. A base station, comprising:
a receiver configured to receive, in a data region of current channel occupation duration (COD), a data packet from a user equipment (UE); a processor configured to perform a listen before talk (LBT) process after the current COD; and a transmitter configured to send a response message to the UE in a data region of a next COD after the LBT process performed by the processor,
wherein each COD comprises DATA, the DATA comprises n frames, each frame of the n frames comprises p subframes and a first set of p short pilots (SPs) that are in a one-to-one correspondence to the p subframes; and
the transmitter is further configured to send a first short pilot signal to the UE on a first SP of the first set of p SPs, wherein the first short pilot signal comprises a sequence number of a frame in which the first SP is located,
wherein n and p are positive integers greater than or equal to 1.

6. The base station according to claim 5, wherein p is a positive integer greater than 1, and the first short pilot signal further comprises a sequence number of a subframe corresponding to the first SP.

7. The base station according to claim 5, wherein the transmitter is further configured to send a second short pilot signal to the UE on a second short pilot (SP) of the next COD, wherein the second short pilot signal comprises a sequence number of the second SP, wherein the COD further comprises an LP, the LP comprises a second set of m SPs, and m is a positive integer greater than or equal to 1.

8. The base station according to claim 5, wherein the data packet comprises an access request message, and the response message comprises an access response message.

* * * * *